US008214830B2

(12) United States Patent
Leung et al.

(10) Patent No.: US 8,214,830 B2
(45) Date of Patent: Jul. 3, 2012

(54) PERFORMANCE IN A VIRTUALIZATION ARCHITECTURE WITH A PROCESSOR ABSTRACTION LAYER

(75) Inventors: Hin L. Leung, San Jose, CA (US); Amy L. Santoni, Austin, TX (US); Gary N. Hammond, Fort Collins, CO (US); William R. Greene, Fort Collins, CO (US); Kushagra V. Vaid, San Jose, CA (US); Dale Morris, Steamboat Springs, CO (US); Jonathan Ross, Woodinville, WA (US)

(73) Assignee: Intel Corporation, Santa Clara, CA (US)

( * ) Notice: Subject to any disclaimer, the term of this patent is extended or adjusted under 35 U.S.C. 154(b) by 1372 days.

(21) Appl. No.: 11/041,061

(22) Filed: Jan. 19, 2005

(65) Prior Publication Data

US 2006/0161917 A1 Jul. 20, 2006

(51) Int. Cl.
*G06F 9/46* (2006.01)
*G06F 9/00* (2006.01)
*G06F 1/24* (2006.01)

(52) U.S. Cl. .............................. 718/100; 713/1; 713/100

(58) Field of Classification Search .......... 718/104–105; 711/1, 100, 200
See application file for complete search history.

(56) References Cited

U.S. PATENT DOCUMENTS

| | | | | |
|---|---|---|---|---|
| 5,983,017 A * | 11/1999 | Kemp et al. | | 717/129 |
| 6,081,890 A * | 6/2000 | Datta | | 713/1 |
| 6,134,578 A * | 10/2000 | Ehlig et al. | | 718/100 |
| 6,161,166 A * | 12/2000 | Doing et al. | | 711/125 |
| 6,199,159 B1 * | 3/2001 | Fish | | 713/2 |
| 6,327,704 B1 * | 12/2001 | Mattson et al. | | 717/153 |
| 6,513,156 B2 * | 1/2003 | Bak et al. | | 717/151 |
| 6,587,947 B1 * | 7/2003 | O'Donnell et al. | | 713/187 |
| 6,594,756 B1 * | 7/2003 | Moran et al. | | 713/2 |
| 6,622,260 B1 * | 9/2003 | Marisetty et al. | | 714/10 |
| 6,763,327 B1 * | 7/2004 | Songer et al. | | 703/21 |
| 6,944,699 B1 * | 9/2005 | Bugnion et al. | | 710/269 |
| 6,959,262 B2 * | 10/2005 | Curry, III | | 702/183 |
| 7,028,305 B2 * | 4/2006 | Schaefer | | 719/310 |
| 7,036,007 B2 * | 4/2006 | Schelling et al. | | 713/1 |
| 7,222,203 B2 * | 5/2007 | Madukkarumukumana et al. | | 710/260 |
| 7,272,832 B2 * | 9/2007 | Gardner | | 718/105 |
| 7,373,446 B2 * | 5/2008 | Post et al. | | 710/261 |
| 7,451,451 B2 * | 11/2008 | Schaefer | | 719/310 |
| 7,512,956 B1 * | 3/2009 | Nicholes et al. | | 719/328 |
| 7,516,453 B1 * | 4/2009 | Bugnion | | 718/1 |
| 2002/0184287 A1 * | 12/2002 | Nunally | | 709/1 |
| 2003/0009648 A1 * | 1/2003 | Doing et al. | | 711/202 |
| 2004/0148603 A1 * | 7/2004 | Baylis | | 718/100 |
| 2005/0044301 A1 * | 2/2005 | Vasilevsky et al. | | 711/1 |
| 2005/0188374 A1 * | 8/2005 | Magenheimer | | 718/100 |
| 2005/0210178 A1 * | 9/2005 | Klingman | | 711/1 |
| 2005/0235287 A1 * | 10/2005 | Harper | | 718/100 |
| 2006/0150183 A1 * | 7/2006 | Chinya et al. | | 718/100 |
| 2007/0011486 A1 * | 1/2007 | Li et al. | | 714/5 |

* cited by examiner

*Primary Examiner* — Emerson Puente
*Assistant Examiner* — Adam Lee
(74) *Attorney, Agent, or Firm* — Trop, Pruner & Hu, P.C.

(57) ABSTRACT

Embodiments of apparatuses and methods for improving performance in a virtualization architecture are disclosed. In one embodiment, an apparatus includes a processor and a processor abstraction layer. The processor abstraction layer includes instructions that, when executed by the processor, support techniques to improve the performance of the apparatus in a virtualization architecture.

13 Claims, 10 Drawing Sheets

US 8,214,830 B2

PERFORMANCE IN A VIRTUALIZATION ARCHITECTURE WITH A PROCESSOR ABSTRACTION LAYER

BACKGROUND

1. Field

The present disclosure pertains to the field of data processing, and more particularly, to the field of virtualizing resources in data processing apparatuses.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" having virtual resources that the OS may completely and directly control, while the VMM maintains a system environment for implementing virtualization policies such as sharing and/or allocating the physical resources among the virtual machines (the "virtualization environment"). Each OS, and any other software, that runs on a virtual machine, unaware of the virtualization environment, is referred to as a "guest" or as "guest software," while a "host" or "host software" is software, such as a VMM, that runs outside of, and may or may not be aware of, the virtualization environment.

A processor in a data processing apparatus may support virtualization, for example, by supporting an instruction to enter a virtualization environment to run a guest on a virtual processor. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A processor may also support other instructions for maintaining a virtualization environment, and may include register bits that indicate or control virtualization capabilities of the processor.

BRIEF DESCRIPTION OF THE FIGURES

The present invention is illustrated by way of example and not limitation in the accompanying figures.

DETAILED DESCRIPTION

The following description describes embodiments of techniques for improving performance in a virtualization architecture with a processor abstraction layer ("PAL"). In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention include techniques for improving performance in a virtualization architecture, and may be applied to any data processing apparatus having a processor and a PAL. For example, the techniques may be applied to an apparatus having a single processor and a single PAL supporting a single or multiple virtualization environments, each having its own VMM, to an apparatus having multiple processors and multiple PALs supporting a single or multiple virtualization environments, and to an apparatus having one or more multicore processors and one or more PALs supporting one or more virtualization environments.

Figure 1:
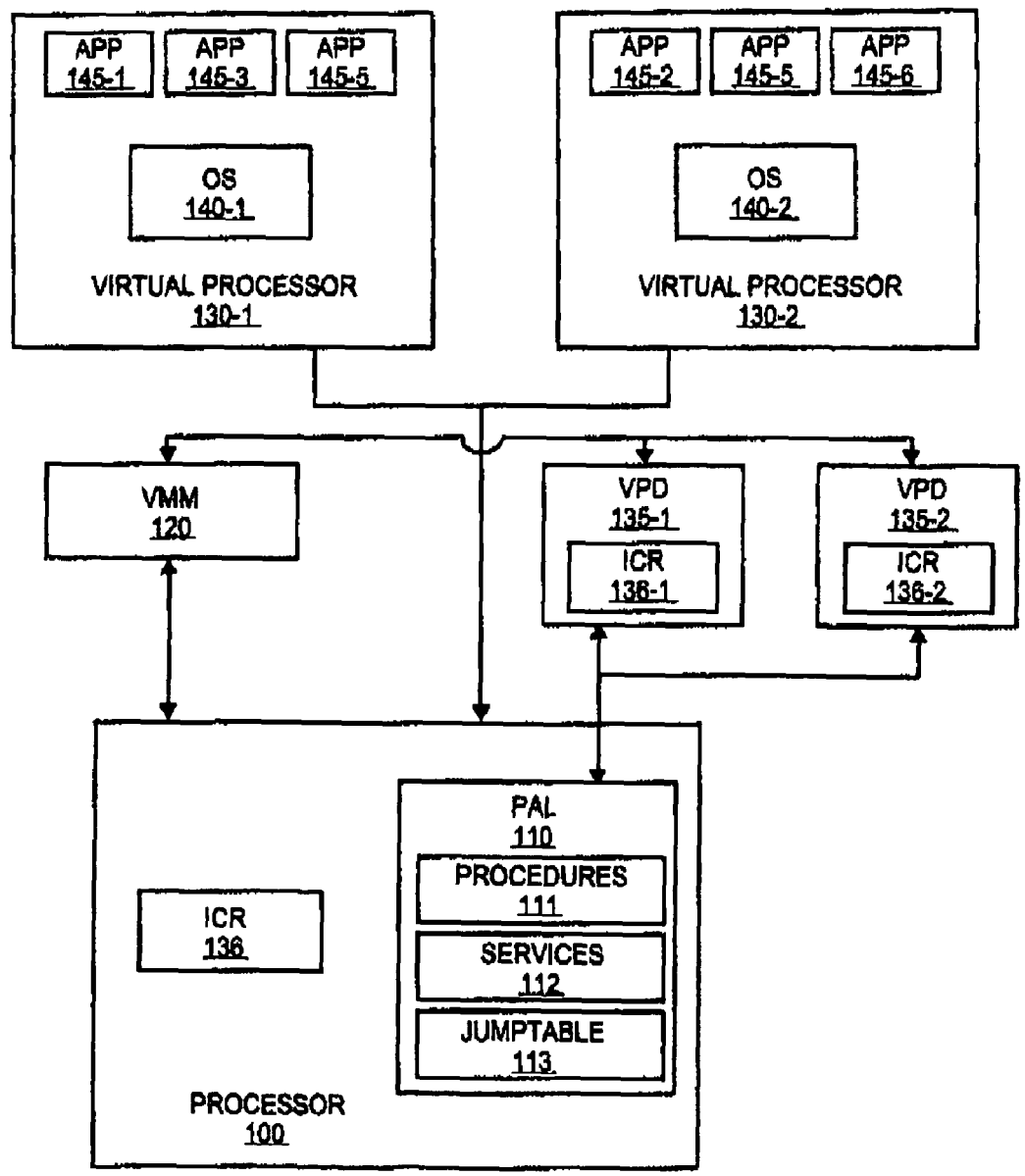
FIG. 1 illustrates an architecture for supporting virtualization according to an embodiment of the present invention.

FIG. 1 illustrates an architecture for supporting virtualization according to an embodiment of the present invention. Processor 100 may be any of a variety of different types of processors that may be used in a virtualization architecture. For example, the processor may be a general purpose processor such as a processor in the Pentium® Processor Family, the Itanium® Processor Family, or other processor family from Intel Corporation, or another processor from another company.

PAL 110 is code for accessing processor hardware and creating and managing virtualization data structures, and may be implemented in firmware, microcode, or any other form of non-volatile or persistent memory, but may be copied to dynamic or any other form of memory. PAL 110 may also include code unrelated to virtualization.

VMM 120 is software for creating and managing virtual processors and implementing virtualization policies within one or more virtualization environments. In the embodiment of FIG. 1, VMM 120 has created virtual processor 130-1 for running OS 140-1 and application software 145-1, 145-3, and 145-5, and virtual processor 130-2 for running OS 140-2 and application software 145-2, 145-4, and 145-6. Although FIG. 1 shows only two virtual processors and eight guests, any number of virtual processors may be created, any number of guests may be run on each virtual processor, and any guest may run on more than one virtual processor within the scope of the present invention.

PAL 110 may be used to provide a consistent software interface for VMM 120 to access processor hardware. For example, PAL 110 may be modified to access the enhanced hardware of a new processor, such as the next generation of processor 100, or to account for hardware features that have been removed from a new processor, with no change to VMM 120 or any guest.

PAL 110 may be implemented to include PAL procedures 111 and PAL services 112. PAL procedures 111 are known functions, typically called to manipulate processor-specific settings, such as settings in a machine specific register. Therefore, a caller typically preserves some architectural state before calling a PAL procedure 111, and PAL procedures 111 include checks to be performed at entry to ensure that the input parameters and the calling environment conform to the architecture. Also, PAL procedures 111 are called by jumping to a single entry point of PAL code that includes a decode operation to determine the function to be performed.

In contrast, PAL services 112 are low latency, low overhead functions that do not include any input parameter or processor state checking, and do not include a decode operation. Input parameter and processor state checking may be avoided by assuming that the caller is responsible for the integrity of the input parameters to PAL services 112.

The decode operations necessary for PAL procedures 111 may be avoided by passing to a caller, at initialization, a base address for PAL service code. An entry point for each PAL service is defined as an offset in jump table 113, which is stored in memory accessible to the caller. Therefore, the caller may branch directly to the offset from the base address corresponding to the desired PAL service, and no decode is required.

Furthermore, in some embodiments, the preservation of architectural state by a caller may be avoided or minimized. Typically, PAL services are called by a VMM while the VMM is executing an interrupt handler. To allow the interrupt handler access to certain hardware resources, certain architectural state information may have been saved upon entry to the interrupt handler. For example, in a processor in the Itanium® Processor Family, sixteen of the static registers are automatically saved by hardware when an interrupt occurs. By using some of these static registers to pass parameters to a PAL service, no additional architectural state needs to be saved by the VMM when calling the PAL service.

Figure 2:
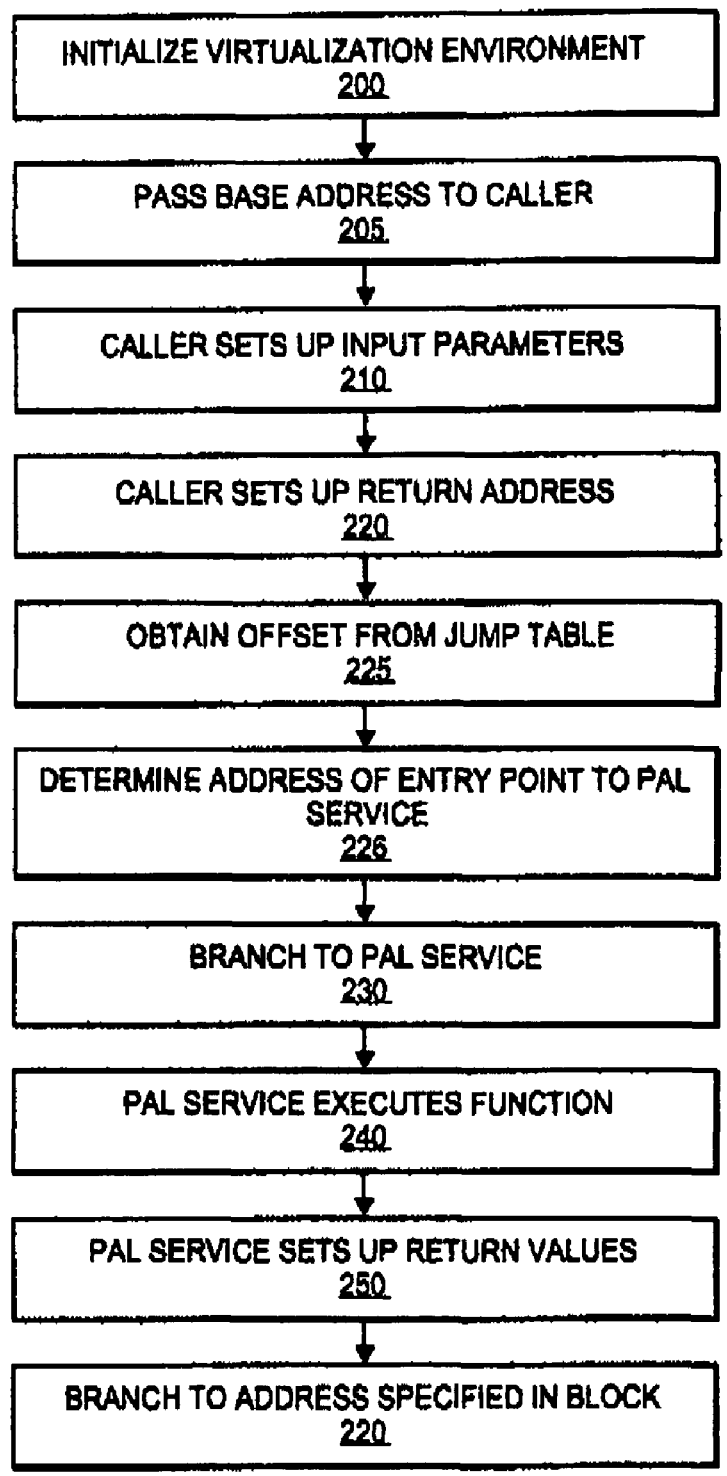
FIG. 2 illustrates a method for calling a processor abstraction layer service according to an embodiment of the present invention.

FIG. 2 illustrates a method for calling a PAL service according to an embodiment of the present invention. In block 200, a virtualization environment is initialized. In block 205, a base address is passed to a caller. In block 210, the caller sets up input parameters for the PAL service. In block 220, the caller sets up a return address to which the PAL service will branch when it is complete. In block 225, the offset for the PAL service is obtained from a jump table. In block 226, the address of the entry point to the PAL service is determined by adding the offset to the base address. In block 230, the caller invokes the PAL service by branching to the address determined in block 226. In block 240, the PAL service executes the PAL function. In block 250, the PAL service sets up one or more return values, if any. In block 260, the PAL service transfers control to the address specified in block 220.

Therefore, performance may be improved by implementing virtualization functions, or any other functions, as PAL services instead of as PAL procedures. For example, functions that are not invoked frequently, perhaps only at boot time, may be implemented as PAL procedures, whereas functions that are invoked frequently during run-time may be implemented as PAL services. In some embodiments, such as those described for PAL services to virtualization, lower latency may be achieved by designing the interface to the PAL service to exactly match the state that the processor will be in when the caller calls the procedure.

Returning to FIG. 1, associated with virtual processors 130-1 and 130-2, respectively, are virtual processor descriptor ("VPD") 135-1 and 135-2, which are data structures encapsulating the performance-critical architectural state of the associated virtual processors. For example, VPD 135-1 and 135-2 may include, respectively, virtual copies 136-1 and 136-2 of interrupt control register 136. VPDs 135-1 and 135-2 may also include any additional state or other information related to a virtual processor, such as configuration options specific to a virtual processor to allow performance tuning. For example, different interrupt handlers may be used depending on the OS.

In one embodiment, when a guest is running on processor 100, an access to interrupt control register 136 may be intercepted, such that the virtual copy of the interrupt control register in that virtual processor's VPD is accessed by VMM 120 without interfering with the architectural state of processor 100 or of the other virtual processors supported by processor 100. A VPD may be stored anywhere in the memory accessible to processor 100 through PAL 110 and VMM 120.

Figure 3:
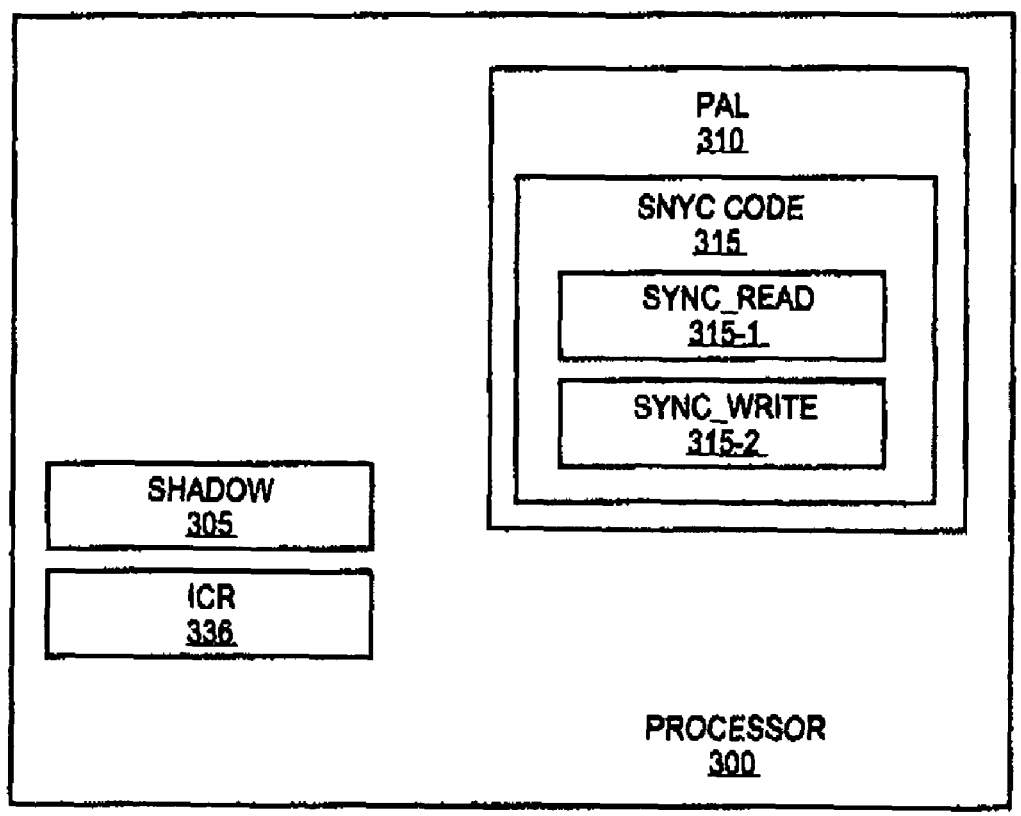
FIG. 3 illustrates an embodiment of the present invention using shadow registers to support virtualization.

In another embodiment, for example, as shown in FIG. 3, processor 300 may include one or more shadow registers 305 for supporting virtualization. For example, one shadow register 305 may be used to shadow interrupt control register 336. In this embodiment, an access to interrupt control register 336 by a guest is directed, through processor 300, to shadow register 305. Therefore, performance may be improved by eliminating the software overhead associated with exiting the virtualization environment to allow a VMM to access the VPD of the running guest, then re-entering the virtualization environment to continue executing the guest. The performance improvement may be significant because every access to a virtualized register may otherwise result in a separate exit from and entry into the virtualization environment.

In the embodiment of FIG. 3, PAL 310 includes synchronization code 315, which has a SYNC_READ routine 315-1 and a SYNC_WRITE routine 315-2, to support hardware shadowing. SYNC_READ routine 315-1 and SYNC_WRITE routine 315-2 may be implemented as PAL services, as described above.

Figure 4:
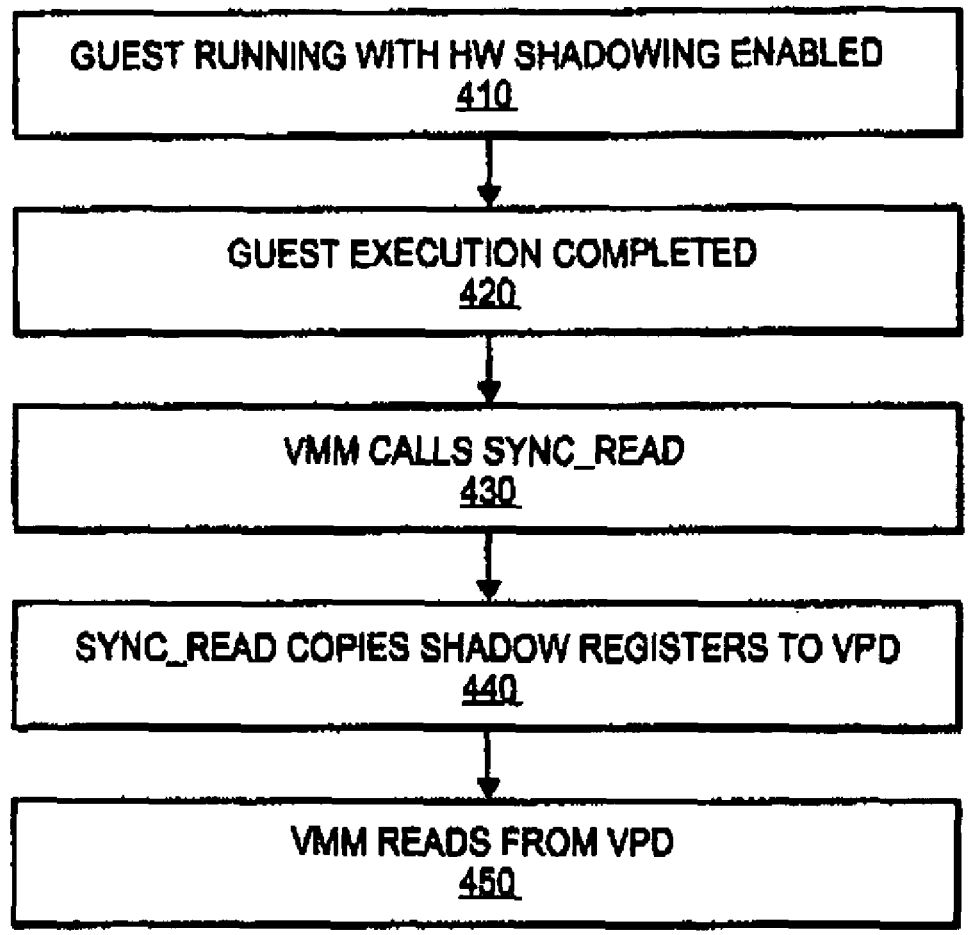
FIG. 4 illustrates a method for shadow register synchronization according to an embodiment of the present invention.

For example, in block 410 of FIG. 4, a guest runs with hardware shadowing enabled on processor 300. Because hardware shadowing is enabled, as described above, an attempt by the guest to write to a register that is shadowed with shadow register 305 may result in modification of the value in shadow register 305 but not the corresponding value in the VPD for that guest. Therefore, as follows, the VMM uses SYNC_READ routine 315-1 to ensure that the latest values that should be in the virtual register for that guest are available to the VMM.

In block 420, guest execution is completed, suspended, or otherwise terminated such that control is passed to a VMM. Then, in block 430, before the VMM reads the VPD for that guest, the VMM calls SYNC_READ routine 315-1. In block 440, SYNC_READ routine 315-1 copies the values from the shadow registers 305 to the corresponding entries in the VPD. Then, in block 450, the VMM reads the latest values from the VPD.

Figure 5:
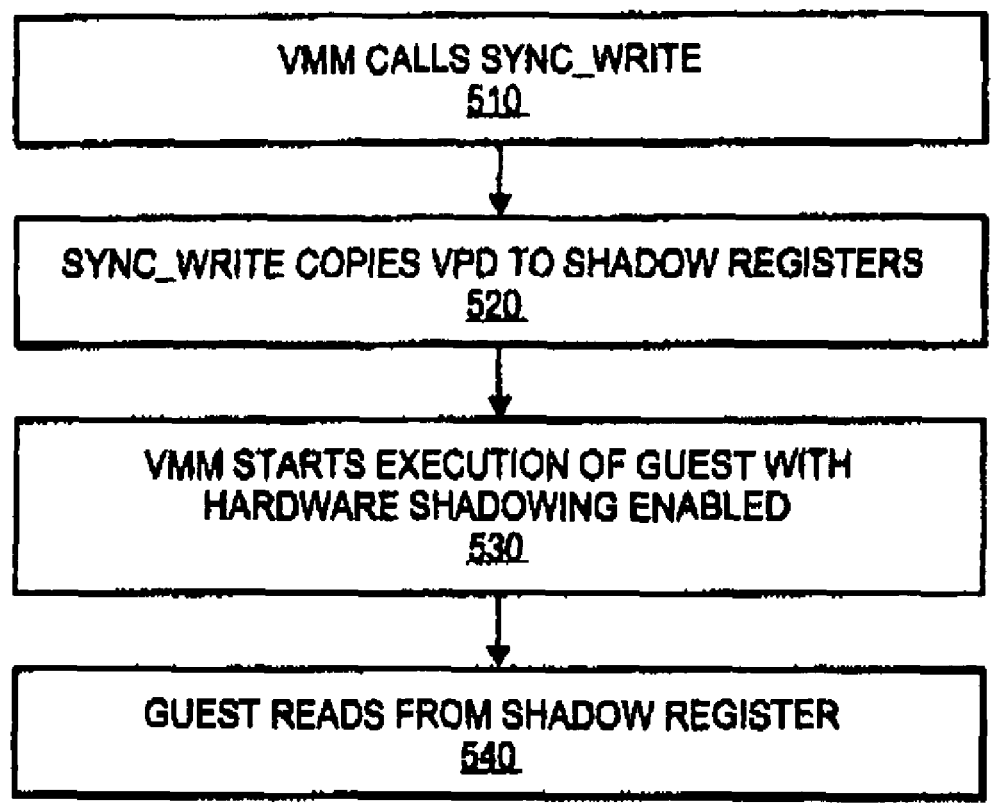
FIG. 5 illustrates another method for shadow register synchronization according to an embodiment of the present invention.

Similarly, in block 510 of FIG. 5, before a VMM starts the execution of a guest with hardware shadowing enabled on processor 300, the VMM calls SYNC_WRITE routine 315-2. In block 520, SYNC_WRITE routine 315-2 copies the values from the VPD of the guest into shadow registers 305, to ensure that the latest values are available to that guest. In block 530, the VMM starts execution of the guest with hardware shadowing enabled on processor 300. In block 540, the guest reads the latest value of its virtual register from shadow register 305.

Figure 6:
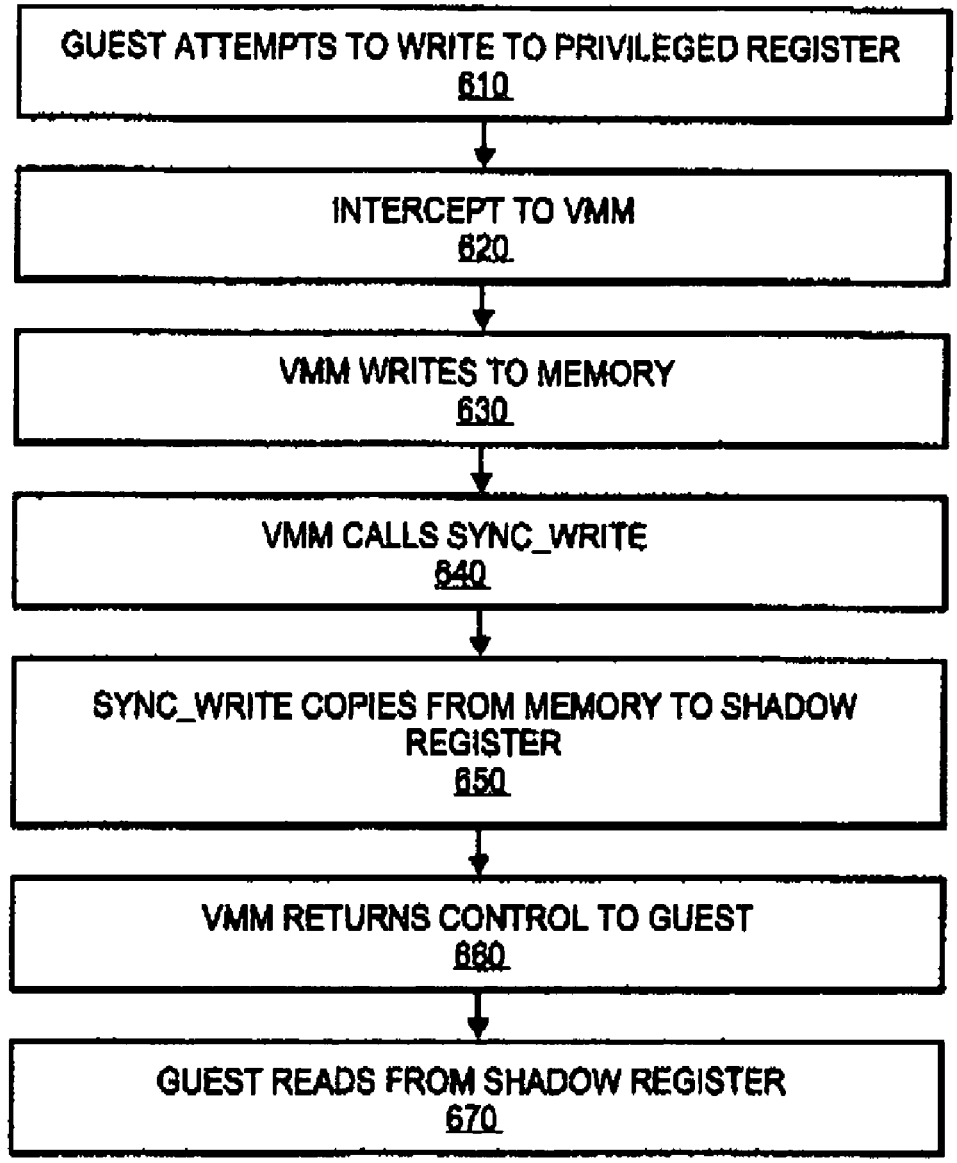
FIG. 6 illustrates another method for shadow register synchronization according to an embodiment of the present invention.

Another embodiment, where a guest is running, the VMM is called, then the VMM returns control to the guest, is illustrated in FIG. 6. This sequence may occur, for example, where a guest is not permitted to write to a certain register (a "privileged" register), even if it is shadowed in hardware. In block 610, a guest attempts to write to a privileged register. In block 620, an intercept to a VMM is raised. In block 630, the VMM performs the write to memory. In block 640, the VMM calls a SYNC_WRITE routine. In block 650, the SYNC_WRITE routine copies the value from memory to a shadow register. In block 660, the VMM returns control to the guest. In block 670, the guest reads the latest value of its virtual copy of the privileged register from the shadow register.

Although the embodiment of FIG. 3 illustrates shadowing of interrupt control register 336, any other architectural registers of processor 300 may be shadowed instead of or in addition to interrupt control register 336, and any number of shadow registers may be provided to shadow one or more architectural registers. Here, "architectural register" means any register or processor state information that is visible to or accessible through software. Therefore, the implementation of synchronization code 315 depends on the hardware shadowing provided by processor 300. However, as described above, PAL 310 may provide a consistent software interface regardless of the hardware implementation.

For example, PAL 310 may be written to directly access the appropriate shadow register in processor 300 when a shadowed architectural register is accessed by a guest and hardware shadowing is enabled, but to access the appropriate memory location when an architectural register is not shadowed in hardware or hardware shadowing is disabled. Then, synchronization code 315 is written to synchronize only those registers that may actually be shadowed in hardware (i.e., hardware shadowing is provided and enabled).

PAL 310 also handles the case of VMM enabling hardware shadowing of a register that is not shadowed in hardware. For example, a processor may provide no shadow registers, but PAL 310 may nevertheless provide for a VMM to enable shadowing of certain architectural registers in anticipation of support for hardware shadowing in future generations of the processor. In this case, PAL 310 handles a virtualization event caused by a register access instead of passing it to the VMM as an intercept, because the VMM is operating under the assumption that hardware shadowing of the register is provided. Having PAL 310 provide for the shadowing of certain hardware resources even before any processor is designed to support such shadowing may be desirable because it allows VMM software to be written in advance, such that the VMM software may be compatible with earlier processors that do not provide such shadowing and may also take advantage of shadowing capabilities provided by later processors.

Therefore, in one embodiment, upon detecting the virtualization event related to hardware shadowing, PAL 310 may check if hardware shadowing is enabled to determine whether to handle the event or pass it to the VMM. Although this approach has been described with respect to hardware shadowing, it may be used for virtualization events related to any other optimizations that PAL 310 and/or processor 300 may provide.

Figure 7A:
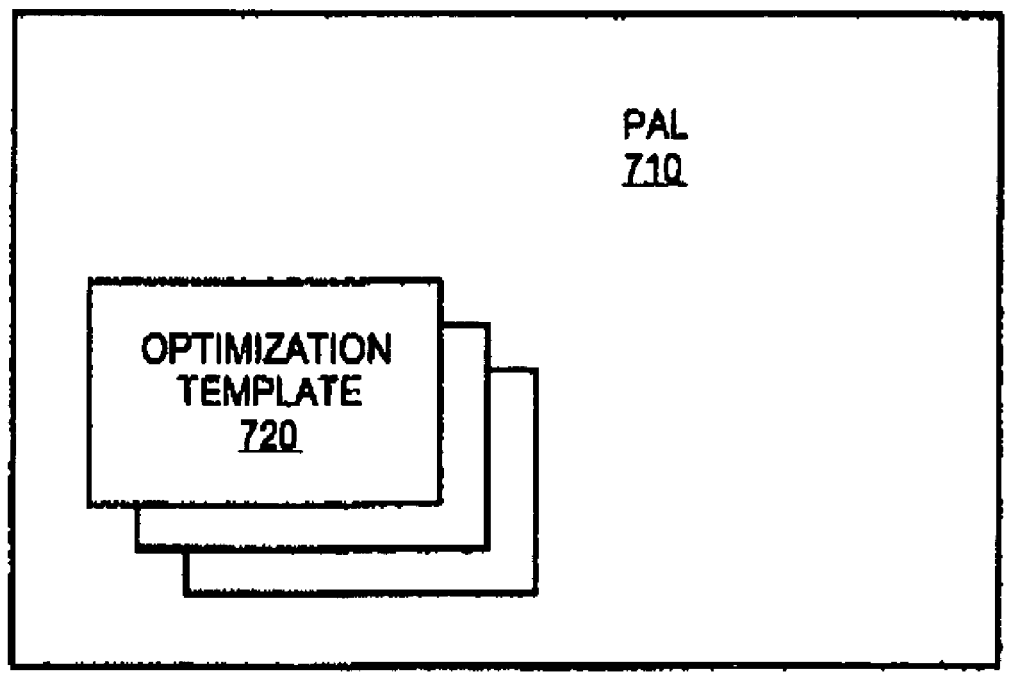
FIG. 7A illustrate an embodiment of the present invention using an optimization template.

In another embodiment, illustrated in FIG. 7A, performance may be improved by eliminating the overhead associated with PAL 710 checking whether an optimization is enabled every time a corresponding virtualization event occurs. Instead of such checking, a predetermination of whether PAL 710 handles the virtualization event or passes it to a VMM is provided by an optimization template 720. Optimization template 720, made available by PAL 710, is chosen from a number of optimization templates when the virtualization environment is initialized. The choice of optimization template 720 may be based on optimization settings selected by the VMM and the hardware capabilities of the processor.

One embodiment of optimization template 720 may provide for the VMM to handle all virtualization events corresponding to optimizations (a "VMM-optimized template"). If a VMM-optimized template is chosen at initialization, PAL 710 will transfer control to the VMM immediately upon detecting a virtualization event corresponding to an optimization. Another embodiment of optimization template 720 may provide for PAL 710 to handle all virtualization events corresponding to optimizations (a "generic template"). A generic template may be used to avoid modifying a VMM for different implementations of processors, and/or to provide for the use of optimizations of which a VMM may not be aware.

Any number of different optimization templates 720 is possible within the scope of the present invention, because, among other reasons, a different template may be used depending on what optimizations are supported or contemplated. For example, backward compatibility to previous processor generations may be supported by providing, in PAL 710, a choice of VMM-optimized templates corresponding those previous processor generations.

In yet another embodiment of an optimization template, the PAL handles all events related to optimizations for which hardware is provided to accelerate the optimization. Conversely, the VMM handles all events related to optimizations for which no hardware is provided to accelerate the optimization because no performance advantage may be gained by allowing the PAL to handle these events.

Figure 7B:
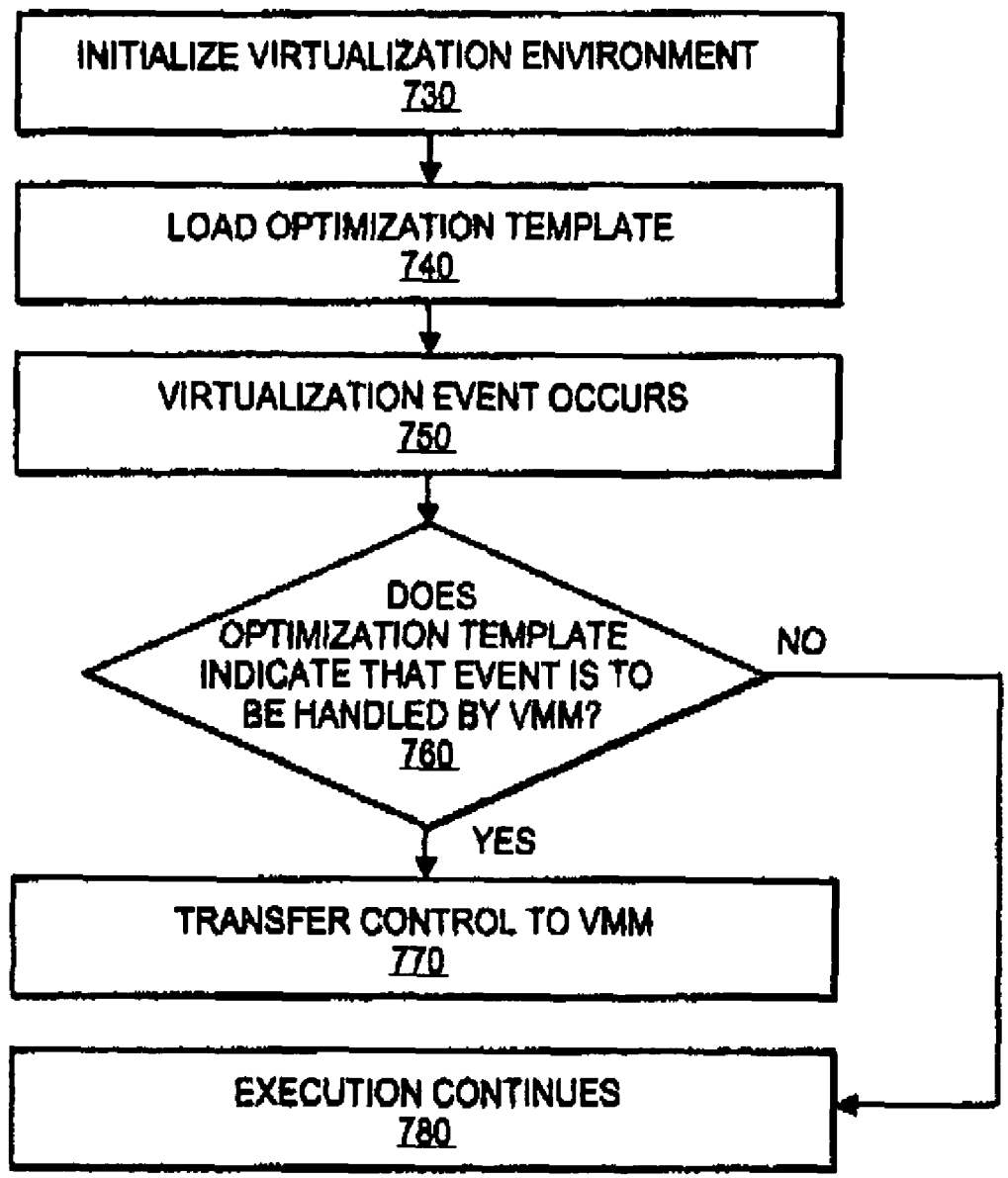
FIG. 7B illustrates a method of handling a virtualization event according to an embodiment of the invention.

FIG. 7B illustrates a method of handling a virtualization event according to an embodiment of the present invention. In block 730, a virtualization environment is initialized. In block 740, an optimization template is loaded. In block 750, a virtualization event relating to an optimization occurs. In block 760, an indicator in the optimization template determines whether the event is to be handled by a VMM. If so, then in block 770, control is transferred to the VMM. If not, then in block 780, execution continues with no transfer of control to the VMM.

Figure 7C:
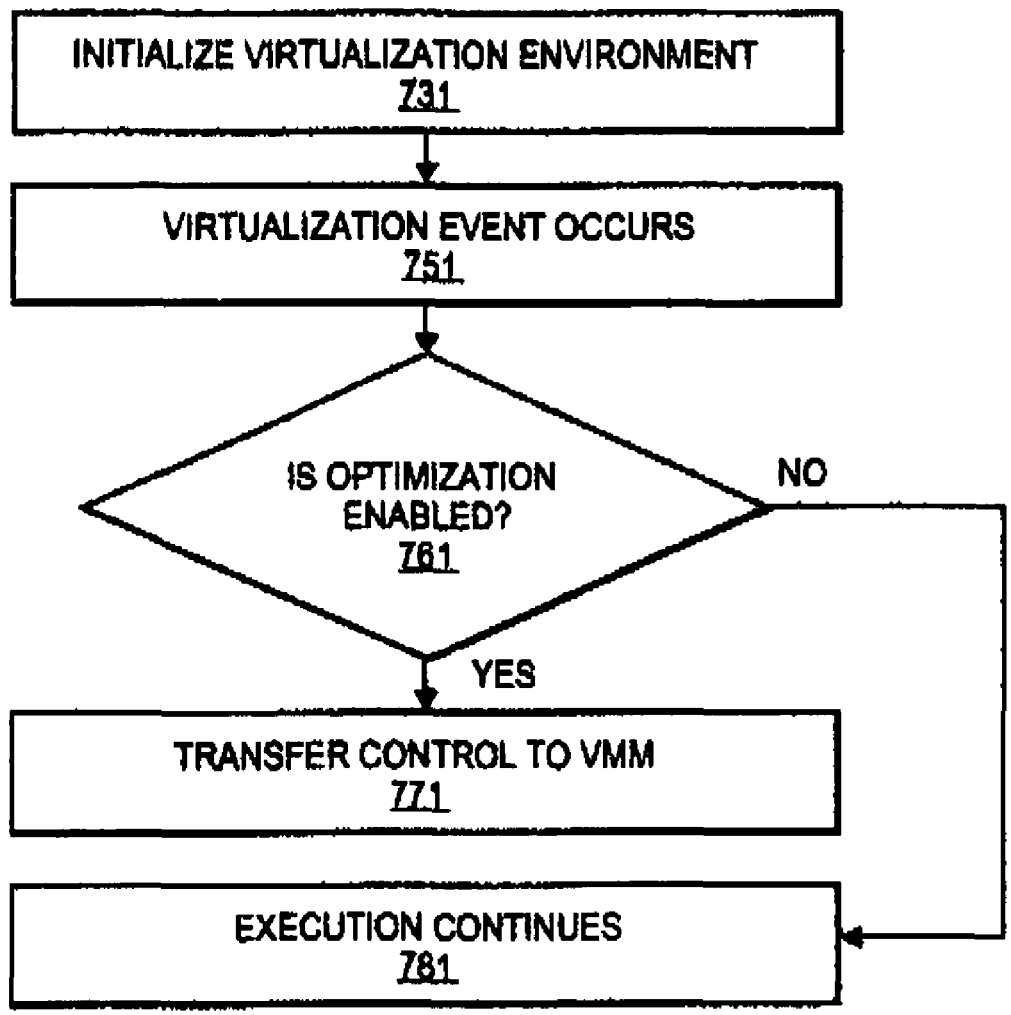
FIG. 7C illustrates a method of handling a virtualization event according to another embodiment of the invention.

FIG. 7C illustrates an alternate embodiment where an optimization template is not used. In block 731, a virtualization environment is initialized. In block 751, a virtualization event relating to an optimization occurs. In block 761, the PAL checks whether the optimization is enabled. If the optimization is enabled, then in block 771, control is transferred to the VMM. If not, then in block 781, execution continues with no transfer of control to the VMM.

Figure 8:
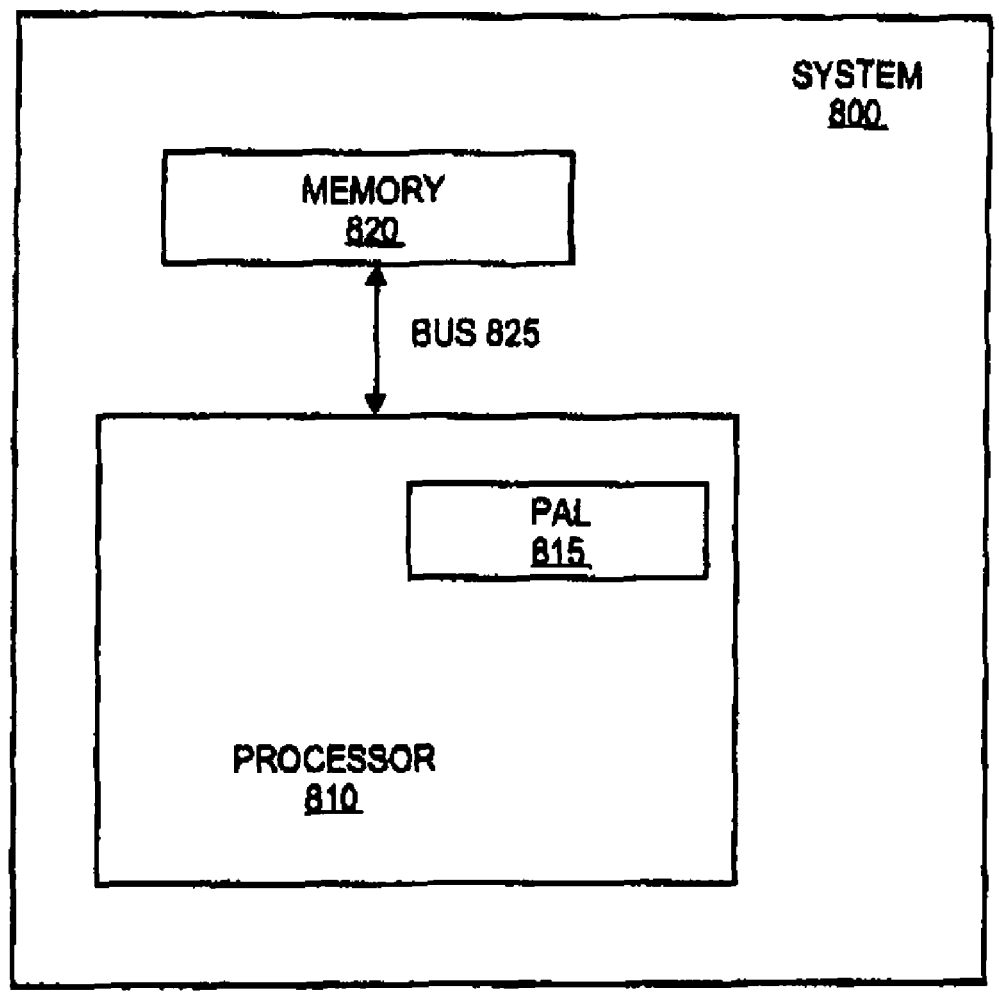
FIG. 8 illustrates a system supporting virtualization according to an embodiment of the present invention.

FIG. 8 illustrates a system 800 supporting virtualization in accordance with an embodiment of the present invention. System 800 includes processor 810 and PAL 815 from FIG. 1, implemented according to the embodiment of FIG. 1 and coupled to memory 820 through bus 825, or through any other buses or components, such as a memory controller or system logic. Memory 820 may be any type of memory capable of storing data to be operated on by processor 810, such as static or dynamic random access memory, semiconductor-based read only or flash memory, or a magnetic or optical disk memory. VMM, operating system, application, and any other type of software may be stored in memory 820. System 800 may also include any other buses, such as a peripheral bus, or components, such as input/output devices, in addition to processor 810, PAL 815, memory 820, and bus 825.

Processor 100, processor 810, or any other component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for improving performance in a virtual architecture with a PAL been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a processor;
a processor abstraction layer ("PAL") including PAL procedure instructions, accessible to the processor as a PAL procedure with a decode operation to determine a first function to be performed with a parameter checking operation and with a processor state checking operation, and PAL service instructions, accessible to the processor as a PAL service without a decode operation to determine a second function to be performed without the parameter checking operation and without the processor state checking operation, where the PAL service instructions, when executed by the processor, support at least one technique to improve the performance of the apparatus in a virtualization architecture.

2. The apparatus of claim 1, wherein the PAL also includes a PAL service jump table.

3. The apparatus of claim 2, wherein the PAL service jump table includes an offset value, and the PAL service is accessible to the processor by executing an instruction to branch to a memory location addressable as a base address plus the offset value.

4. The apparatus of claim 1, wherein the processor includes circuitry to support the virtualization of a hardware resource.

5. The apparatus of claim 4, wherein the circuitry is a shadow register to shadow attempts to access an architectural register.

6. The apparatus of claim 5, wherein the instructions include synchronization instructions that, when executed by the processor, synchronize the values in the shadow register with the values in a virtual register corresponding to the architectural register.

7. A method comprising:
initializing a virtualization environment in a virtualization architecture;
performing a parameter checking operation in connection with calling a procedure instruction in a processor abstraction layer ("PAL");
performing a processor state checking operation in connection with calling the procedure instruction;
calling the procedure instruction;
performing a decode operation, in response to calling the procedure instruction, to determine a first function to be performed;
and
calling a service instruction in the PAL without a decode operation to determine a second function to be performed to support at least one technique to improve the performance of software running in the virtualization architecture without the parameter checking operation and without the processor state checking operation.

8. The method of claim 7 further comprising passing a base address of the PAL service to the caller.

9. The method of claim 7 further comprising executing the service instruction to synchronize a hardware resource to support virtualization with a virtual resource.

10. The method of claim 9 wherein the hardware resource is a shadow register and the virtual resource is a virtualized copy of an architectural register.

11. The method of claim 7 further comprising determining whether the service instruction is to be executed based on an indicator.

12. The method of claim 11 wherein the indicator is based on an enable indicator that indicates whether the technique is enabled.

13. The method of claim 11 wherein the indicator is based on a selection indicator that indicates whether the service instruction is selected.

* * * * *